Feb. 12, 1924.
S. H. BROOKS
1,483,212
VAPOR CONSERVATION SYSTEM
Filed March 17, 1921   2 Sheets-Sheet 2
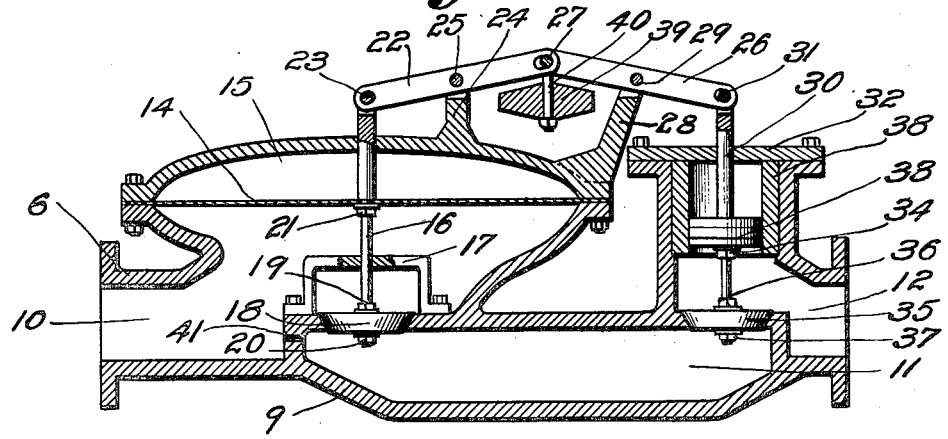
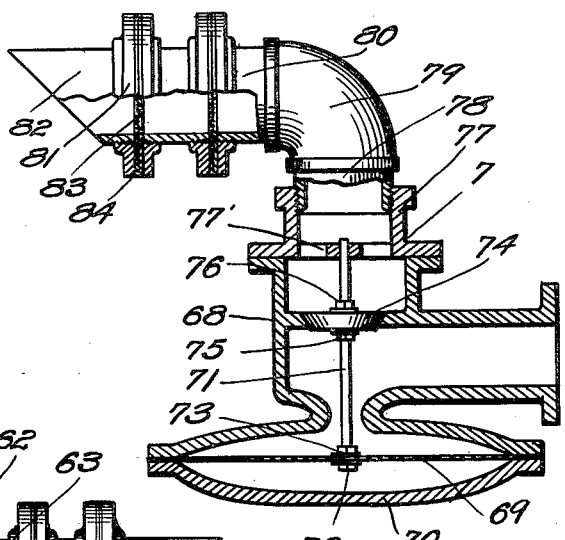
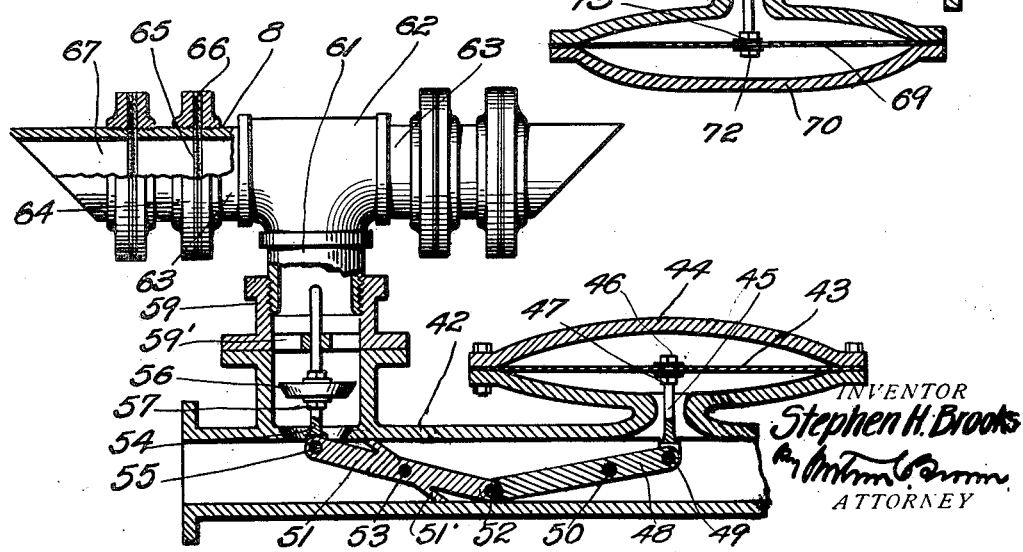
INVENTOR
Stephen H. Brooks
ATTORNEY Patented Feb. 12, 1924.

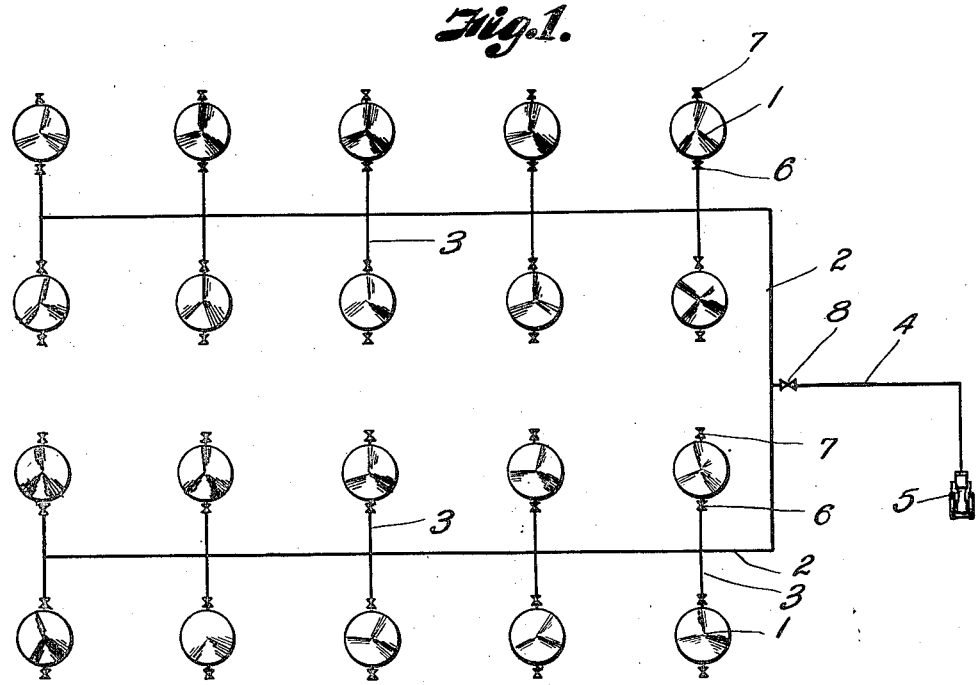
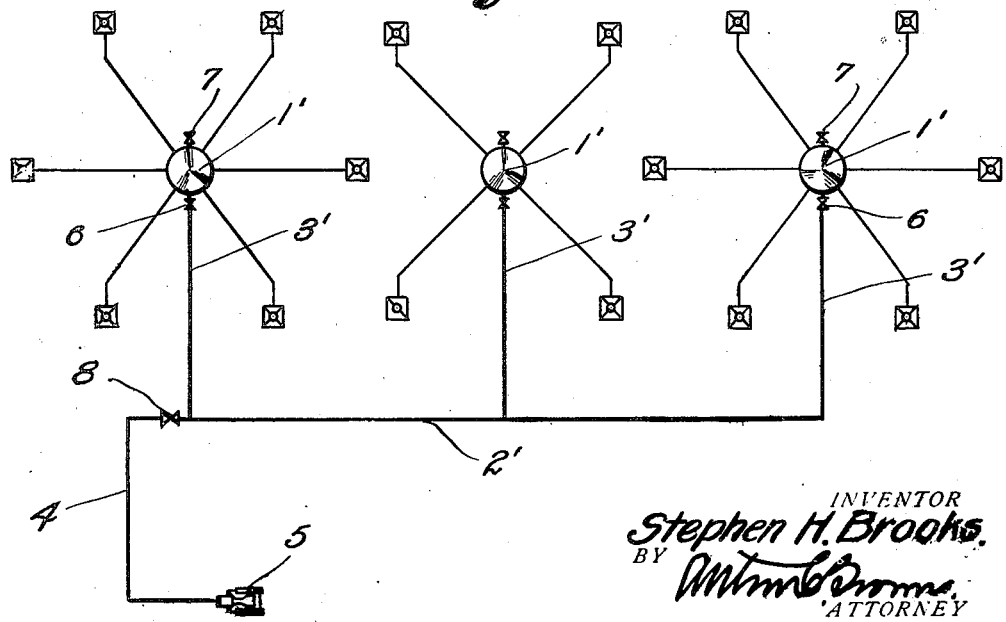

1,483,212

UNITED STATES PATENT OFFICE.

STEPHEN H. BROOKS, OF MUSKOGEE, OKLAHOMA, ASSIGNOR TO OIL CONSERVATION ENGINEERING COMPANY, OF CLEVELAND, OHIO, A CORPORATION OF OHIO.

VAPOR-CONSERVATION SYSTEM.

Application filed March 17, 1921. Serial No. 453,086.

*To all whom it may concern:*

Be it known that I, STEPHEN H. BROOKS, a citizen of the United States, residing at Muskogee, in the county of Muskogee and State of Oklahoma, have invented certain new and useful Improvements in Vapor Conservation System; and I do declare the folllowing to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improvement in vapor conservation systems especially applicable to oil tanks which constitute receptacles for light volatile oils.

One of the purposes of the invention is to provide a vapor conservation system for use in connection with tanks containing light volatile and gaseous oils, the system being designed to conserve the rich vapors arising from the oil and which ordinarily are wasted.

It is the general practice in the oil producing fields to pipe the oil from the wells into flow or settling tanks, the majority of which have open tops, with the result that there is a maximum loss of the vaporous content of the oil. The systems now generally in use for storing crude oil, gasoline, benzine and the like include tanks having capacities as high as fifty-five thousand barrels each and such tanks are usually provided with a vent line which will allow the displaced or expanded gases or volatile vapors to escape as oil is pumped into the tank or as the temperature increases. The vapors arising from the oil and which generally escape to atmosphere are rich in gasoline content and it is the purpose of my invention to provide a system which will vent the tank as the gases accumulate and allow such gases to be piped to a compressor so that they may be compressed and the gasoline content recovered.

Generically, the invention involves a system in which there is a vapor relief valve connected to the oil tank adapted to open at a very slight pressure and adapted to close at a slight vacuum or minus pressure, the valve being so sensitive that it will open and close before there is sufficient difference in the range or pressures within the tank to either force up the light sheet iron roof plates covering the tanks or cause the collapse thereof under minus pressure.

The invention also may contemplate a vacuum relief valve connected to the oil tank to open under a very light minus pressure or partial vacuum within the tank due to piping out of oils or condensing or partially condensing of contained gases.

I also may utilize a vent valve inserted in the vapor line between the vapor relief valve and the compressor, which will automatically open whenever the compressor is inoperative so as to allow the gases passing through the vapor relief valve to escape to atmosphere.

The invention consists of certain arrangements of parts and combinations of parts, the generic forms of which are disclosed in the accompanying drawings, in which—

Fig. 1 illustrates a group of oil storage tanks with vapor and relief valves applied to each tank and a connecting line connecting groups of tanks in parallel and provided with a vent valve leading to an exhauster.

Fig. 2 illustrates a plurality of groups of flow or settling tanks with well connections and having vapor and vacuum relief valves applied, the tanks being in communication with a line having a vent valve and leading to an exhauster.

Fig. 3 is a vertical, longitudinal, sectional view through one of the pressure-actuated vapor relief valves.

Fig. 4 is a vertical, longitudinal, sectional view through one of the vacuum-actuated relief valves, and Fig. 5 is a vertical, longitudinal, sectional view through one of the vapor vent valves.

The tanks 1 in Fig. 1 are connected to a main pipe line 2 by branch pipe lines 3, the line 2 being in communication with an exhauster line 4, communicating with an exhauster 5, which may comprise an air compressor or the like.

In Fig. 2 the tanks 1' are connected to the line 2' by branches 3', an exhauster line 4 being in communication with the line 2' connected to an exhauster or compressor 5.

Each tank is provided with a vapor relief valve 6 and a vacuum or minus pressure relief valve 7, connected near the eaves of the tanks. The relief valve 6 is in the branch pipe 3 for each tank, as will be clearly seen by reference to Figs. 1 and 2, and there is in addition a vapor vent valve 8 at some point in the line 2 or 2' as the case may be, but in the present instance, the vapor vent valve is shown as located in the exhauster pipe 4.

The vapor relief valve 6, shown in Fig. 3, is illustrated as comprising a hollow casting 9, which encloses the inlet or pressure chamber 10, an intermediate chamber 11 and an outlet or exhausting chamber 12. Located in the upper portion of the inlet chamber 10 is a diaphragm 14, enclosed by the diaphragm chamber cover 15.

The diaphragm 14 is connected to a valve operating stem 16, which passes through a spider-shaped guide or cage 17 and carries on its lower end a valve 18 secured to the valve stem by nuts 19 and 20. The valve stem is fastened to the diaphragm on the upper side by means of a shoulder and at the lower side by a nut 21. The valve stem 16 passes through the diaphragm chamber cover 15 and is connected to a lever 22 by means of a pin 23. The lever 22 is pivoted on a support shown as a lug 24, conveniently integral with the cover 15, the pivot for the lever 22 comprising a pin 25, passing through the lug. One end of the lever 22 is connected to the lever 26 by a pin 27, the lever 26 being supported on the lug 28 through the medium of a pin or pivot 29, one end of the lever 26 being connected to the valve stem 30 through the medium of the connecting pin 31, there being sufficient lost motions between the connections to permit play of the levers 22 and 26 and allow rectilineal movements to be imparted to the stems 16 and 30. The valve stem 30 passes through a piston cylinder cover 32 and carries a piston 33 which is secured in place against the shoulder on the valve stem 30 by a nut 34, the valve stem 30 being also connected at its lower end to the valve 35, which is fastened thereto by nuts 36 and 37.

The piston 33 travels in a liner 38, the inner bore of which is the same diameter as the valve 35. If there is a slight vapor pressure in chamber 10, the diaphragm 14 will be moved upward, raising the valve stem 16, which, through the action of levers 22 and 26, will lift the valve stem 30. The raising of the valve stems 16 and 30 will, in turn, raise the valves 18 and 35, allowing the vapor to travel from the inlet chamber to the intermediate chamber 11 and through the outlet chamber 12, thence through pipe line 2 to the exhauster line 4 and exhauster 5.

The lever connecting pin 27 supports a counter weight 39, by means of the bolt 40. The counter weight 39 equalizes the weight of the valve stems 16 and 30 and the valves 18 and 35 and piston 33 so that a very delicate adjustment and operation of the diaphragm may take place, due to variations in pressure either minus or plus, acting upon the diaphragm 14.

After a slight accumulation of vapor pressure has unseated the valves 18 and 35 and after the accumulated vapor has been exhausted by compressor 5 and the compressor starts to pull vapor from tank 1 through the valve 6, thereby creating a vacuum, diaphragm 14 will be pulled down, thereby causing the valve stems 16 and 30, acting through the connecting levers 22 and 26, to seat the valves 18 and 35 and prevent vacuum or suction great enough to occur within the tank 1 to collapse it.

Upon the closing of the valve openings, compressor 5 will build up a considerable vacuum in outlet 12, which must be neutralized to allow the diaphragm 14 to again operate under the slightest pressure and for this reason piston 33 is provided having the same diameter as the valve seat for valve 35, that is the effective area of valve 35 is that of the lower face which covers the effective port area or lower port area of the valve seat, the effective port area of the valve seat 35 and the piston 33 having the same diameter. Therefore, whatever vacuum is built up by the compressor 5 will not affect either the valve 35 or the piston 33 because there will be a downward pull on the piston 33 and an upward pull of corresponding value on the valve 35.

It is possible that the valve 35 may not seat tight enough to prevent a slight leakage in case of a considerable vacuum in chamber 12; therefore, I provide an equalizer passage 41, which is provided between the inlet or pressure chamber 10 and the intermediate chamber 11 to prevent the building up of pressure in chamber 10 so as to hold valve 18 seated and oppose the upward movement of the diaphragm 14 upon a slight variation in positive pressure within the chamber 10. The equalizer 41 also serves to maintain an equal pressure in both inlet or pressure chamber 10 and the intermediate chamber 11 so that the pressure on both sides of the valve 18 will be equal and opposite and will not interfere with the proper operation of the diaphragm 14.

The vent valve 8 shown in Fig. 4 consists of a main body casting 42, containing a diaphragm 43 covered by a diaphragm chamber cover 44. The diaphragm 43 has connected to it a diaphragm rod 45 secured by nuts 46 and 47. The lower end of the diaphragm rod 45 is connected to a lever 48, by means of a pin 49. The lever 48 is pivoted on a pin 50, which has its bearing in lugs on the inner side of the main body casting 42. The lever 48 is connected to a lever 51 by means of a pin 52. The lever 51 is on pivot pin 53, which has its bearing on the inner side of the main body casting 42. The lever 51 has cast as a part of it, a butterfly disk 51' and said lever 51 is connected to a valve operating stem 54 by a pin 55, a valve operating stem 54 supporting a disk valve 56 secured by nuts 57 and 58. The vent outlet of the main body casting 42 is covered over by a flanged connection casting 59, which carries a spider valve stem guide 59', and prevents the valve disk 56 from becoming tilted. The flanged outlet casting 59 is connected to a pipe nipple 61 of the T-shaped connection 62, which carries the nipple 63, flanges 64 and outlet nipple 67. Between each pair of flanges 64 is inserted fine mesh screens 65, preferably of brass with asbestos gaskets 66 on opposite sides. In operation, when the compressor 5 is shut down or out of operation, valve 8 stands in the position as shown in Figs. 4, the diaphragm 43 being at rest and the valve disk 56 being raised, which will allow any gases accumulating in tank 1 and passing through the vapor lines 2 and 4 to pass through valve 56, through nipples 63 and 67 and fittings 62 and 64. The brass screens 65 are furnished to prevent a flash back of any fire in case of vapors passing out through the nipple 67 becoming ignited.

Upon starting the exhauster or air compressor 5, a vacuum will be created by reason of the butterfly valve 51', which is a part of the lever 51, closing the main passageway through valve 8, such vacuum acting upon the diaphragm 43 will pull the diaphragm down and act through the rod 45, levers 48 and 51 and valve stem 54 to lower the valve 56 to its seat and open the butterfly valve 51', thereby closing the vent passage to the atmosphere and opening the main vapor passageway from tank 1 to compressor 5.

As long as the compressor 5 is kept in operation, the vacuum or pull created by it will pull on the diaphragm 43 and thereby hold the valve 56 on its seat but should the exhauster 5 be shut down or its operation impaired, the diaphragm 43 will return to its normal position which, operating through levers 48 and 51, will raise the valve 56, closing the butterfly valve 51' and allowing any further accumulation of gases in tank 1 to escape to atmosphere through vent line nipples and fittings 61, 62, 64 and 67.

The vacuum relief valve 7, shown in Fig. 5, consists of a main body casting 68, enclosing a diaphragm 69, covered by a diaphragm cover 70. The diaphragm 69 connects to the end of a valve operating stem 71 by means of the nuts 72 and 73. The valve stem 71 has mounted upon it a valve disk 74 secured to the valve stem 71 by nuts 75 and 76. The main body casting 68 has a flange connection cap 77, upon the lower face of which is a spider valve stem guide 77' which prevents the valve stem 71 from becoming tilted.

Connected to connection cap 77 is a nipple 78, elbow 79, nipple 80, flanges 81 and outlet nipple 82. Inserted between each pair of flanges 81 are fitted fine mesh screens 83, preferably of brass and provided with asbestos gaskets 84 on opposite sides, the screens being provided to prevent any possible flash back of ignition of vapors which might be expelled through the valve 7. In operation a very slight vacuum created in tank 1 will lift diaphragm 69, raising valve 74, allowing air to enter the tank 1 through valve 74 and as soon as the vacuum within the tank 1 has been relieved, diaphragm 69 and valve 74 will lower under their own weight, closing valve 7 against the admission of further air. The valve 7 is further proof against opening or leakage, should pressure occur within the tank 1, for the pressure within the tank 1 will force down diaphragm 69, holding valve disk 74 more tightly to its seat.

While I have described but a single valve for each of the operations, that is, a single construction of vapor relief valve 6, vacuum relief valve 7 and vapor vent valve 8, it is to be understood that each tank is provided with valves as shown in Figs. 3 and 5 and the exhauster line is provided with a valve shown in Fig. 4, the exhauster being conveniently shown diagrammatically as an air compressor.

It will also be apparent that the system as hereinbefore disclosed will be effective in conserving the high volatile hydrocarbon vapors generated from oil introduced into the tank from the oil wells, from which it is pumped and that the conservation of the lighter hydrocarbons can be effected without liability of causing distortion or rocking of the tank tops or covers, due to variations in pressure, either positive or minus.

What I claim and desire to secure by Letters-Patent is:

1. A system for conserving the lighter hydrocarbons generated from hydrocarbon oils comprising a tank, a pipe leading from the tank, an exhauster at one end of the pipe, a pressure-actuated valve in the pipe movable to open position only upon accumulation of pressure in the tank to allow communication with the exhauster, and a suction-actuated valve in the pipe between the pressure-actuated valve and the exhauster and normally open to atmosphere.

2. A system for conserving the lighter hydrocarbons generated from hydrocarbon oils, comprising a tank, a pipe leading from the tank, an exhauster at one end of the pipe, a pressure operated valve in the pipe, whereby the gaseous vapor may enter the pipe only upon accumulation of the pressure within the tank, and a suction actuated valve in the pipe between the pressure actuated valve and the exhauster, said suction actuated valve being normally opened to atmosphere and movable into closing position in response to the suction created by the exhauster.

3. A system for conserving the lighter hydrocarbons generated from hydrocarbon oils, comprising a tank, a pipe leading from the tank, an exhauster at one end of the pipe, a pressure operated valve in the pipe, whereby the gaseous vapor may enter the pipe only upon accumulation of the pressure within the tank, and an air inlet valve in the tank movable in response to a minus pressure within the tank.

4. A system for conserving the lighter hydrocarbons generated from hydrocarbon oils, comprising a tank, a pipe leading from the tank, an exhauster at one end of the pipe, a pressure operated valve in the pipe, whereby the gaseous vapor may enter the pipe only upon accumulation of pressure within the tank, a suction actuated valve in the pipe between the pressure actuated valve and the exhauster, said suction actuated valve being normally open to atmosphere and movable into closing position in response to the suction created by the exhauster, and an air inlet valve in the tank movable in response to a minus pressure within the tank.

5. A system for conserving the lighter hydrocarbons of relatively heavy hydrocarbon oils, comprising a tank, an exhauster, a conduit connecting the tank and exhauster, and a normally closed pressure actuated valve in the conduit having opening movement only in response to pressure within the tank, the exhauster being ineffective to actuate the valve.

6. A system for conserving the lighter hydrocarbon vapors of relatively heavy hydrocarbon oils, comprising a tank, an exhauster, a conduit connecting the exhauster to the tank, a valve in the conduit, movable into open position in response to pressure within the tank only and unaffected by suction created by the exhauster, and a valve between the first named valve and the exhauster movable in response to suction created by the exhauster.

7. A system for conserving the lighter hydrocarbon vapors of relatively heavy hydrocarbon oils comprising a tank, an exhauster, a conduit connecting the exhauster to the tank, a valve in the conduit movable into open position in response to pressure within the tank only and unaffected by suction created by the exhauster, a valve between the first-named valve and the exhauster, means movable in response to suction created by the exhauster for operating the second-mentioned valve, and a third valve controlled by said means normally open to atmosphere when the second-mentioned valve is closed, the last-named valve being seated when the second-mentioned valve is in open position.

In testimony whereof I affix my signature.

STEPHEN H. BROOKS.